United States Patent [19]

Yanagi et al.

[11] Patent Number: 4,482,160
[45] Date of Patent: Nov. 13, 1984

[54] WATERPROOF SEAL RING FOR POWER BRAKE BOOSTER HOUSING

[75] Inventors: Kunio Yanagi; Munesato Andoh, both of Higashimatsuyama, Japan

[73] Assignee: Jidoshi Kiki Co., Ltd., Japan

[21] Appl. No.: 594,109

[22] Filed: Mar. 28, 1984

[30] Foreign Application Priority Data

Apr. 14, 1983 [JP] Japan .................. 58-55763[U]

[51] Int. Cl.³ .................. F16J 15/16; F16J 15/32
[52] U.S. Cl. .................. 277/12; 277/24; 277/29; 277/152; 277/215; 277/84; 60/453
[58] Field of Search ............ 277/12, 24, 29, 32, 277/84, 152, 153, 215, DIG. 4; 60/453, 454

[56] References Cited

U.S. PATENT DOCUMENTS

| | | | |
|---|---|---|---|
| 3,232,628 | 2/1966 | Brand .................. | 277/215 X |
| 3,943,717 | 3/1976 | Schexnayder .................. | 60/453 |
| 4,009,572 | 3/1977 | Cooper .................. | 60/454 |
| 4,234,196 | 11/1980 | Iida .................. | 277/12 |
| 4,337,953 | 7/1982 | Ikeda et al. .................. | 277/152 |

FOREIGN PATENT DOCUMENTS 532112  8/1955  Italy .................. 277/84

Primary Examiner—Robert S. Ward
Attorney, Agent, or Firm—McGlew and Tuttle

[57] ABSTRACT

A waterproof seal ring, to be fitted between the contacting surfaces of a master cylinder body and the front wall of a power booster housing surrounding a bulge of the housing through which a push rod is inserted and having a downwardly extended passage groove formed in the lower part of the wall, has a circumferential vent groove formed on the pressure-contact side of the ring. The vent groove is communicated at the lower end with the passage groove in the front wall of the booster housing and at the upper end with the space inside the bulge.

3 Claims, 7 Drawing Figures

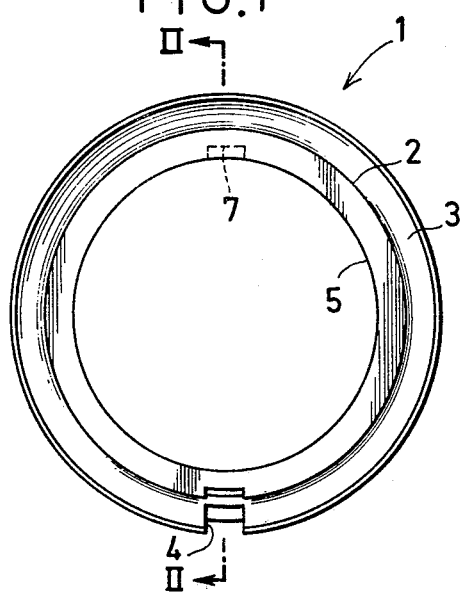
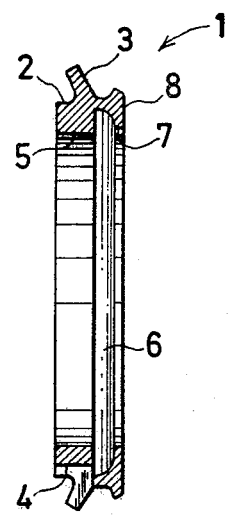
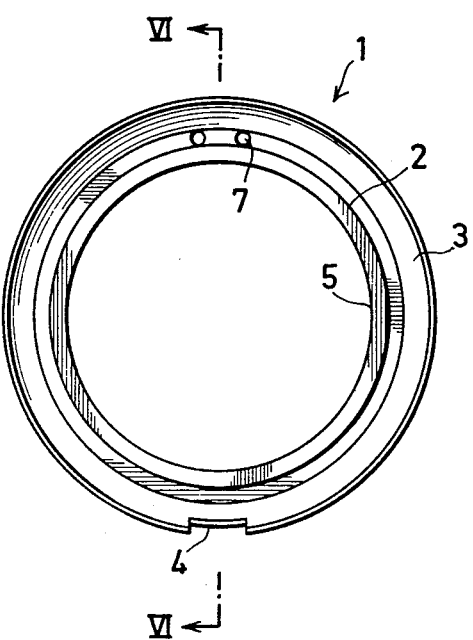
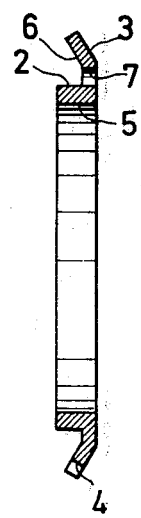

WATERPROOF SEAL RING FOR POWER BRAKE BOOSTER HOUSING

BACKGROUND OF THE INVENTION (i) Field of the Invention

This invention relates to a waterproof seal ring to be fitted between the contacting surfaces of a master cylinder body and a power booster housing.

(ii) Description of the Prior Art

Conventional waterproof seal rings of this character have a recess formed at the lower end of the outer periphery, through which air is allowed to flow into and out of the master cylinder as its piston reciprocates. When rainwater or the like gains entrance between the contacting surfaces of the master cylinder body and the power boosting housing, it will flow down around the outer periphery of the seal ring. The intruding liquid can then be entrained by air that is drawn by suction into the master cylinder, eventually to corrode its inner wall surface. This is particularly true with the arrangements in which the master cylinders are installed with their axes increasingly raised frontwards, for example, to meet the recent design requirements of the braking systems for the front-engine front-wheel-drive automobiles.

SUMMARY OF THE INVENTION

It is accordingly an object of the present invention to provide a waterproof seal ring which can infallibly prevent ingress of rainwater or the like into the master cylinder.

In accordance with the invention a waterproof seal ring is provided which has a circumferential vent groove formed on its pressure-contact side, in communication at the lower end with a passage groove in the front wall of a power booster housing, and at the upper end with the space inside the bulge of the booster housing. Any rainwater or the like finding its way down around the outer periphery of the seal ring to its lower end would be unable to descend through the vent groove. Therefore, the seal positively prevents the entry of rainwater or the like into the bulge of the booster housing, even when the master cylinder is installed with its axis inclined upward toward the front, for example, to meet design requirements of FF type automobiles.

Other objects and advantages of this invention will be apparent from the following description referring to the accompanying drawings.

BRIEF DESCRIPTION OF THE DRAWINGS

FIG. 1 is a front view of the first embodiment of the waterproof seal ring according to the invention;

FIG. 2 is a sectional view taken on the line II—II of FIG. 1;

FIG. 5 is a front view of the second embodiment of the invention;

FIG. 6 is a sectional view taken on the line VI—VI of FIG. 5; and

DETAILED DESCRIPTION OF THE INVENTION

Figure 3:
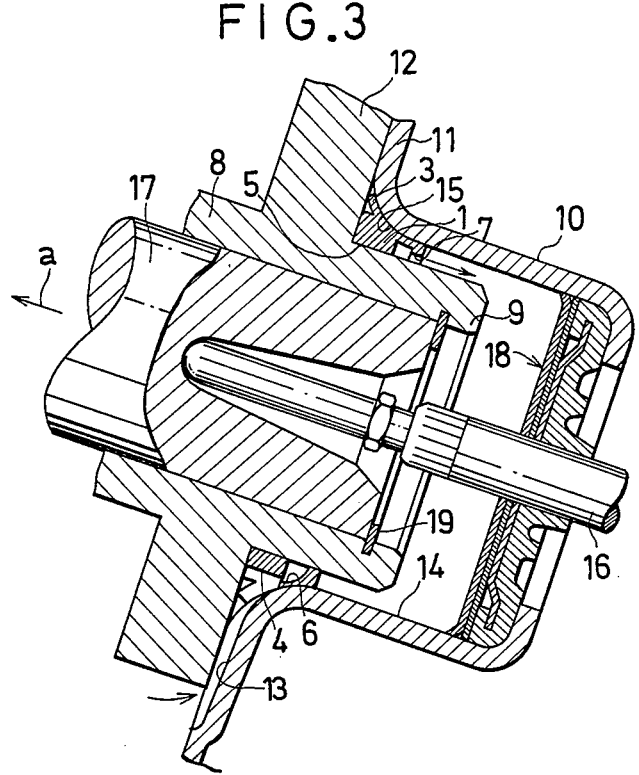
FIG. 3 is a vertical sectional view of the seal ring as mounted in place.

Referring to FIGS. 1 and 2, there is shown a first embodiment of the waterproof seal ring 1 of the invention, made in one piece of synthetic rubber or other similar material. On the outer periphery 2 of the ring is formed a slightly inclined flange 3. The lower end of the seal ring 1, including the corresponding portion of the flange 3, has a first inverted-U-shaped recess 4. On the other hand, the inner periphery 5 of the ring 1 is formed, as shown in FIG. 2, with an annular vent groove 6, which is communicated at its lower end with the first recess 4. The upper end of the inner periphery 5 has a second recess 7 extending axially, through which the upper end of the vent groove 6 is open to one side 8 of the seal ring 1.

This seal ring is attached to a master cylinder in the following manner. As indicated in FIG. 3, the seal ring 1 is first fitted around a protruding end 9 of the master cylinder body 8. Next, the front wall 11 of a power booster housing 10 is secured to a flange 12 of the cylinder body 8 by bolts not shown. During this, as in FIGS. 3 and 4, the first recess 4 of the seal ring 1 and a downwardly extending passage groove 13 formed in the front wall 11 of the booster housing 10 must be kept in register for mutual communication.

Figure 4:
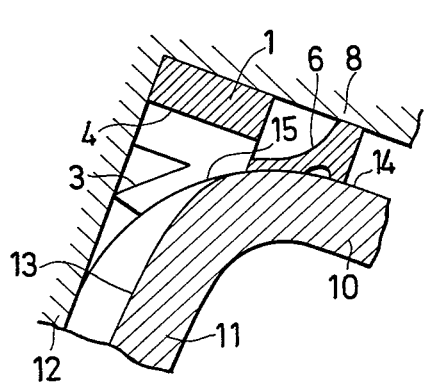
FIG. 4 is an enlarged sectional view of essential parts of FIG. 3.

Fastening the front wall 11 of the power booster housing 10 to the flange 12 in the manner described, as in FIGS. 3 and 4, permits the curved inner wall 15 of the boot-like bulge 14 of the front wall 11 to be in intimate contact with the flange 3 of the seal ring 1. The seal thus established prevents rainwater or the like, which may have gained entrance between the front wall 1 and the flange 3, from getting farther into the bulge 14. Any rainwater or other foreign matter descending around the flange 3 of the seal ring 1 into the first recess 4 would not be able to ascend through the vent groove 6. Thus, even when the master cylinder body 8 is installed as shown in FIG. 3, with its axis slightly raised frontwardly, ingress of rainwater or the like into the bulge 14 is infallibly prevented. In FIG. 3 the numeral 16 designates a push rod, 17 a master cylinder piston, 18 a plate-and-seal assembly, and 19 a stopper ring.

As the master cylinder piston 17 is forced in its actuating stroke in the direction of the arrow a in FIG. 3, the external air is drawn by suction through the lower end of the passage groove 13 and thence through the vent groove 6 and the second recess 7 into the bulge 14 of the booster housing 10. Conversely in the return stroke of the piston 17, the air in the bulge 14 is forced out through the lower end of the passage groove 13 to the atmosphere.

A second embodiment of the invention will now be described with reference to FIGS. 5 to 7. Like the first embodiment, this seal ring 1 is made in one piece of synthetic rubber or the like, with a slightly inclined flange 3 formed on its outer periphery 2. However, as is evident from FIG. 6, the flange 3 extends rather more outwardly than the counterpart of the preceding embodiment. Also, as indicated in FIGS. 5 and 6, the flange 3 is partly cut out at the lower end to a broad inverted U shape as a first recess 4. The flange 3 has a pair of cutouts as second recesses, on the left and right of its upper end portion as viewed in FIG. 5.

Figure 7:
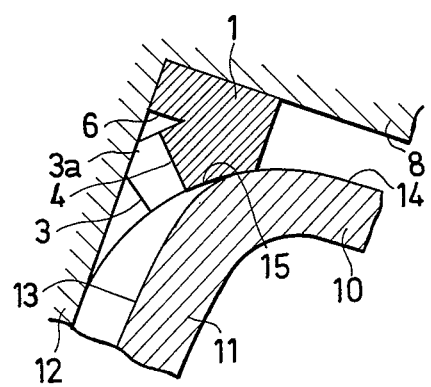
FIG. 7 is a sectional view similar to FIG. 4 but showing the second embodiment mounted in place.

With the construction described above, the seal ring 1 is fitted in place, as shown in FIG. 7, so that its flange 3 is pressed tight by the curved inner wall 15 of the bulge 14, in intimate contact at its tip 3a with the flange 12 of the master cylinder body 8. Thus, an annular vent groove 6 is defined inwardly of the flange 3 of the seal ring 1 to allow air flow into and out of the bulge 14 via the passage groove 13, first recess 4, vent groove 6, and the pair of second recesses 7.

Consequently, any rainwater or other foreign matter that might have found its way down into the first recess 4 would be kept from rising along the vent groove 6. In this way, intrusion of rainwater or the like into the bulge 14 is completely prevented.

While preferred embodiments of the invention have been described, it is to be understood that the invention is not limited to the specific structures illustrated but may be otherwise variously modified. For example, the second recesses 7 of the first and second embodiments need not be always formed in the upper end portion of the seal ring 1 but may be optionally formed elsewhere, for example at a point or points slightly above the first recess 4.

Also, it is not essential that the vent groove 6 be formed along the entire periphery of the seal ring 1. The groove may take whatever form else provided it functions to establish communication between the first and second recesses 4, 7. The vent groove 6 may alternatively be formed in the surface of the seal ring 1 against which the power booster housing 1 is pressed as the latter is fitted in place.

It is further possible, for added airtightness of the inner periphery 5 of the seal ring, to taper it or form an inwardly extending annular rib or ridge on the inner peripheral surface.

What is claimed is:

1. A waterproof seal ring to be fitted between the contacting surfaces of a master cylinder body and the front wall of a power booster housing surrounding a bulge of the housing through which a push rod is inserted and having a downwardly extended passage groove formed in the lower part of the wall, said seal ring being characterized by
    (a) a first recess formed in the lower end portion thereof for communication with said passage groove,
    (b) a vent groove formed circumferentially on the pressure-contact side thereof, communicating at the lower end with said first recess, and
    (c) a second recess formed above said first recess to provide communication between the space inside said bulge and said vent groove.

2. A seal ring according to claim 1, wherein said vent groove is formed on the side of the ring to be in pressure contact with said master cylinder body.

3. A seal ring according to claim 1, wherein said vent groove is formed on the side of the ring to be in pressure contact with said front wall of said power booster housing.

* * * * *